United States Patent [19]

Strong

[11] Patent Number: 4,468,014
[45] Date of Patent: Aug. 28, 1984

[54] COMPOSITE LEAF SPRING

[75] Inventor: John R. Strong, King County, Wash.

[73] Assignee: Paccar, Inc., Bellevue, Wash.

[21] Appl. No.: 371,210

[22] Filed: Apr. 23, 1982

Related U.S. Application Data

[63] Continuation-in-part of Ser. No. 186,998, Sep. 15, 1980, abandoned.

[51] Int. Cl.$^3$ .............................................. F16F 1/22
[52] U.S. Cl. ...................................... 267/47; 188/268
[58] Field of Search ...................... 188/268, 378, 379; 267/30, 37 A, 47, 49, 54 B, 54 R, 55, 148, 149

[56] References Cited

U.S. PATENT DOCUMENTS

| | | | |
|---|---|---|---|
| 2,969,971 | 1/1961 | Nelson . | |
| 3,053,527 | 9/1962 | Hallam | 267/47 |
| 3,172,650 | 3/1965 | Jarret et al. | 188/268 X |
| 3,204,944 | 9/1965 | Brownyer | 267/47 |
| 3,276,762 | 10/1966 | Thomas | 188/268 |
| 3,376,033 | 4/1968 | Sherwood | 267/47 |
| 3,586,307 | 6/1971 | Brownyer | 267/47 |

*Primary Examiner*—Duane A. Reger
*Attorney, Agent, or Firm*—Seed and Berry

[57] ABSTRACT

A composite leaf spring for use in a vehicle suspension system having a pair of metal outer skins and a stiff plastic core bonded between the skins. The core can be made of any one of a variety of filled or unfilled polymers which has a relatively high shearing strength and sufficiently isotropic properties so as to handle stresses in all directions. An important aspect of the invention is that it provides for a simple and inexpensive method for manufacturing a contoured composite leaf spring which includes the steps of first positioning the skins in a spaced relation within a female mold and then pouring or injecting the core material into the space between the skins. Preferably, the skins are of uniform width and thickness to reduce manufacturing costs. In most common vehicle applications, the spring would have a point of maximum thickness in the central section where the bending moment is greatest and would be tapered toward each end. The spring skins should meet the following criterion:

if F equals the static loaded force (in lbs) exerted on the spring, which is supported at its ends;

L equals the length of the spring (in inches) between the end supports;

N equals the number of composite leaves in the spring (each leave comprising two skins bonded to a core); and $T_s$ equals the thickness (in inches) of each skin in each composite leaf;

then:

$$T_s \geq (FL/N)^{\frac{1}{2}}/1500.$$

13 Claims, 5 Drawing Figures

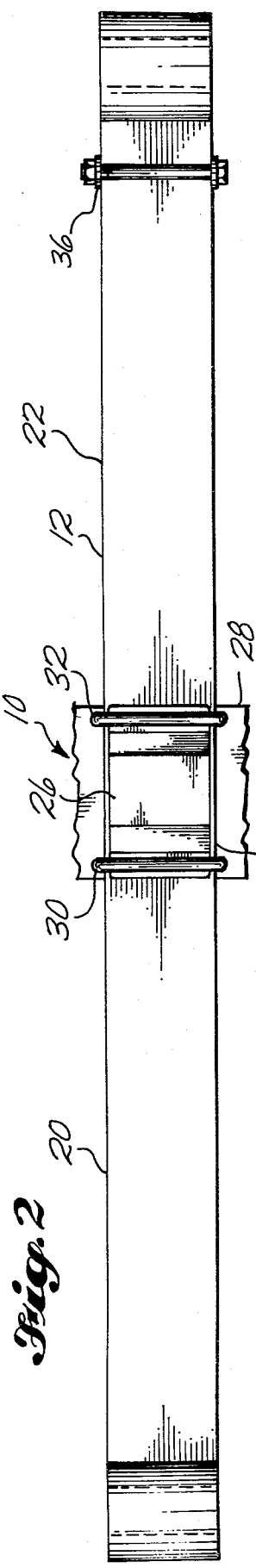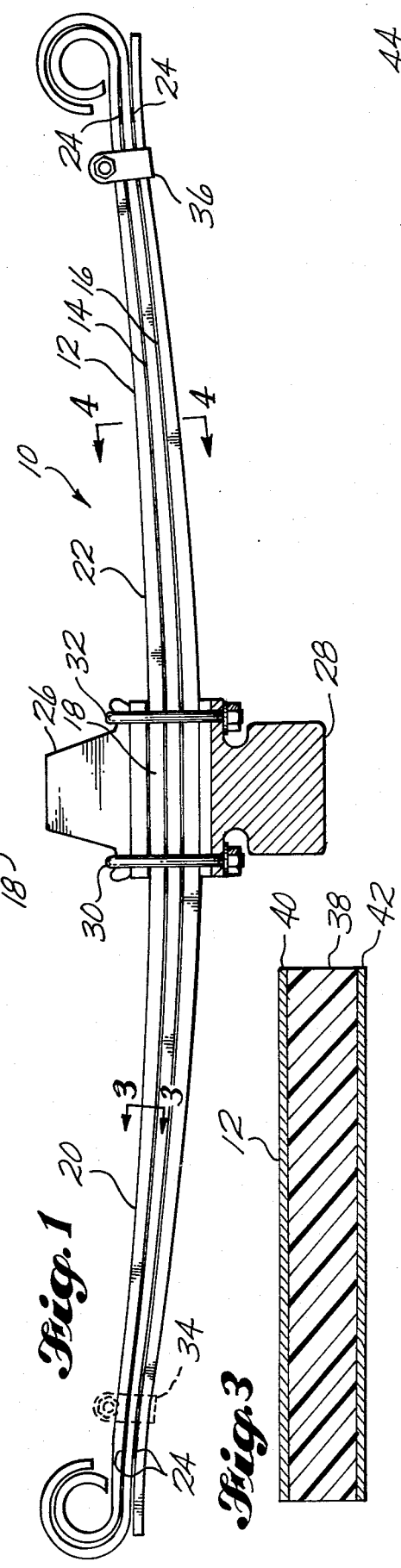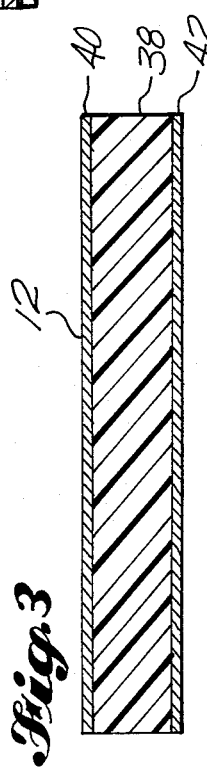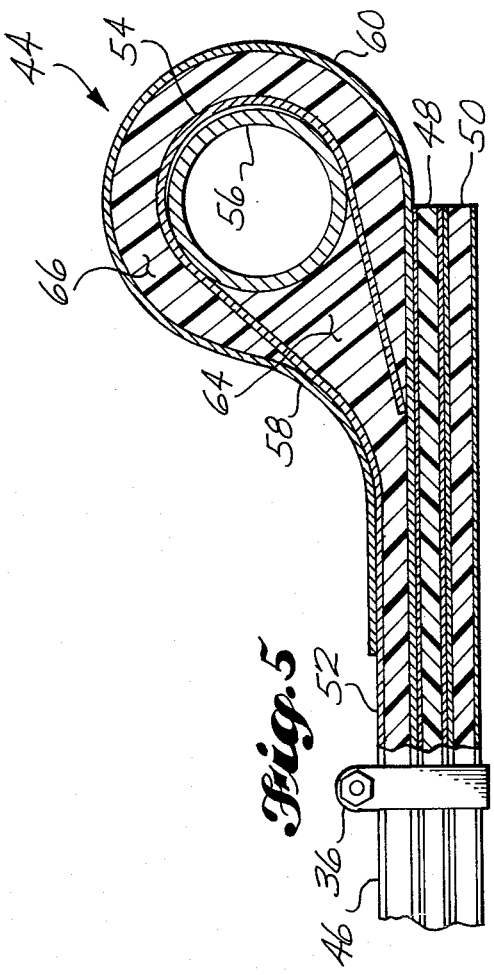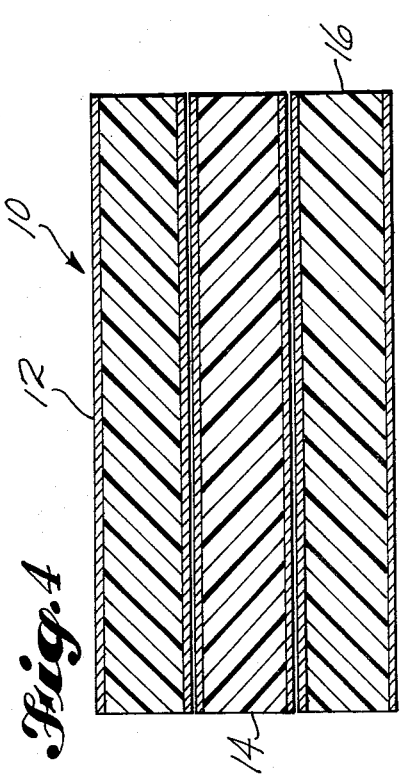

COMPOSITE LEAF SPRING

DESCRIPTION

Cross Reference to Related Application

This application is a continuation-in-part of U.S. patent application Ser. No. 186,998, filed Sept. 15, 1980, now abandoned.

TECHNICAL FIELD

This invention relates to a leaf spring intended for use in a vehicle suspension system, and more particularly, to a composite leaf spring, preferably tapered in shape and having a pair of metal skins and a stiff plastic core bonded between the skins. The invention also relates to a novel method for manufacturing the leaf spring.

BACKGROUND ART

It is common to support a vehicle with a steel beam or leaf spring which is attached at each end to the vehicle chassis and to an axle near the spring's center. In such an arrangement, when the suspension is loaded, the maximum bending moment in the spring occurs at the point where the axle is attached to the spring and decreases in either direction from that point along the spring. It has long been recognized that to make the most efficient use of the spring material, the spring should be tapered in either direction toward its ends from a point of maximum thickness where the axle is attached. Early examples of such tapered springs are shown in U.S. Pat. No. 129,297. To achieve acceptable deflection characteristics in a tapered spring, it is necessary that it be manufactured to a relatively high degree of accuracy. Unfortunately, the manufacturing process available at the time U.S. Pat. No. 129,297 was issued did not permit economical production of such a spring. Even today, the cost of manufacturing a tapered steel leaf spring is relatively high because it requires the use of special tapered rolling machines. As a result, although tapered springs are generally available today for use with larger vehicles, such as heavy trucks, they are significantly more expensive than conventional flat springs.

Another important factor in the design of leaf spring suspensions is the desired spring rate. "Spring rate," which is defined as the rate of increase of force necessary to deflect the spring with deflection, is a function of the cross-sectional area moment of inertia, the length of the spring, and the elastic modulus of the spring material. In general, the spring must be designed so that it is strong enough to withstand the loads imposed upon it in operation and yet have a spring rate which is low enough to provide acceptable ride qualities. Further, the desired spring rate must be achieved within the particular geometric constraints placed on the suspension, such as the maximum allowable length and deflection of the springs.

To achieve a compromise among these various design and economic factors, designers frequently use "built-up" steel spring assemblies which consist of a number of separate spring leaves diminishing in length from the top of the assembly to the bottom to achieve an overall tapered shape. Normally, the leaves are clamped together at their centers where the axle is mounted but are free to slip longitudinally relative to each other when the spring is deflected. The leaves are usually of constant thickness to reduce manufacturing costs, but use of tapered leaves obtains greater efficiency. As previously mentioned, however, the cost of manufacturing such tapered leaves is relatively high.

One of the principal deficiencies of a built-up steel spring assembly is its weight. Due to the dramatic increase in fuel costs in recent years and the consequent necessity to reduce vehicle weight, designers are examining all major vehicle components, including suspensions, to see if ways can be found to reduce their weight without adversely affecting their cost or performance. In particular, it has been suggested that much lighter and more efficient springs could be made from various state-of-the-art plastic or composite materials rather than steel. Some of these materials are particularly attractive for use in constructing springs with nonuniform cross-sections because of the ease with which they can be molded. For a general discussion of the efforts which have been made to adapt these materials for use in leaf springs, see U.S. Pat. No. 3,586,307, to Brownyer.

In spite of these efforts, plastic and composite springs have not been used commercially for a variety of reasons. It is generally accepted that springs made entirely of plastic would be impractical because of excessive bulk and insufficient resistance to wear and impact. One known plastic spring, sold under the trademark GRAFTEK by a division of Exxon Corp., is made from graphite skins with a glass fiber-reinforced epoxy core. This spring has proven impractical due to high cost and its extreme unidirectional stress-carrying capability (anisotropy). That is, the spring is strong enough in the vertical direction but too weak in the transverse or torsional direction to be usable in common suspensions. Since vehicle springs must absorb cornering loads and high impact loads from rocks and other debris, graphite is unsatisfactory as a component of a viable leaf spring. Graphite, for example, has a tensile strength of only around 800 inch-lbs/in$^3$. Composites of metal and plastic have been suggested to alleviate some of these graphite problems. The cost of manufacturing these composite springs has thus far been too great, however, to justify substituting them for all steel spring assemblies.

DISCLOSURE OF INVENTION

This invention can be most broadly summarized as a composite leaf spring intended for use in a vehicle suspension system or a similar application. The composite leaf spring has a pair of metal outer skins and a stiff plastic core disposed between and bonded to each of the skins. The skins and core have sufficient strength in all directions to carry stresses and meet the following criterion:

if F equals the static loaded force (in lbs) exerted on the spring, which is supported at its ends;

L equals the length of the spring (in inches) between the end supports;

N equals the number of composite leaves in the spring (each leave comprising two skins bonded to a core); and $T_s$ equals the thickness (in inches) of each skin in each composite leaf;

then:

$$T_s \leq (FL/N)^{\frac{1}{2}}/1500.$$

In accordance with a more detailed aspect of this invention, the spring is tapered toward each end from a point of maximum thickness in its central section to provide for a more efficient utilization of the spring material in an application where maximum bending moment in the spring occurs approximately midway between its ends.

In one embodiment of this invention, one of the outer skins is formed into a first loop at one end and a hollow cylindrical bushing is disposed within the first loop. The other outer skin is formed into a second loop, which partially encircles the first loop and the bushing so that the loops, the bushing, and the core cooperate to form an integral eye in one end of the spring.

This invention further provides for a method for manufacturing a composite leaf spring which includes the steps of placing the skins in a spaced relation in a positioning and molding fixture and then filling the space between the skins with a moldable plastic to form a core.

Accordingly, it is a principal object of this invention to provide for a composite leaf spring which is significantly lighter than a comparable steel spring but which can be manufactured at a competitive cost.

It is another object of this invention to provide for a lightweight composite leaf spring employing state-of-the-art plastic materials which will be able to withstand the load and impact forces normally imposed upon springs in vehicle suspension systems.

It is a further object of this invention to provide for a method for manufacturing such a lightweight composite leaf spring at a cost competitive with a comparable conventional steel spring.

BRIEF DESCRIPTION OF THE DRAWINGS

FIG. 1 illustrates a built-up leaf spring assembly in which composite leaf springs according to this invention are used.

FIG. 2 is a top view of the spring assembly of FIG. 1.

FIG. 3 is a cross-sectional view of the upper spring in FIG. 1 at 3—3.

FIG. 4 is a cross-sectional view of the entire built-up spring assembly of FIG. 1 taken at 4—4.

FIG. 5 is an alternate embodiment of this invention in which the upper spring in a built-up assembly has an integrally formed eye.

BEST MODE FOR CARRYING OUT THE INVENTION

The novel features believed characteristic of this invention are set forth in the appended claims. The invention itself, however, may be best understood and its objects and advantages best appreciated by reference to the detailed description below in connection with the accompanying drawings. In FIGS. 1 through 4 of those drawings, a built-up leaf spring assembly, generally indicated by the numeral 10, is illustrated. Each of the individual leaves in that assembly, designated by the numerals 12, 14, and 16, respectively, are composite leaf springs which have been constructed in accordance with the present invention.

Upper leaf 12, which is of typical construction, has a flat center section 18 of constant thickness and outer sections 20 and 22 which diminish in thickness in a direction away from the center. Outer sections 20 and 22 are formed to a predetermined curved contour which is preferably circular. In the embodiment illustrated, the contours of each of the springs are identical so that when the leaves are stacked together, the outer ends are spaced apart slightly. Spacers 24, which can be made of any durable friction-reducing material, are placed between the leaves as shown to reduce friction. Alternately, the contours of adjoining surfaces of adjacent springs can be made identical so that the leaves will "nest" when assembled. In each case, plastic liners should be placed between the center sections of each leaf to reduce fretting (as is well known).

The entire spring assembly is clamped tightly together at the center between bump stop 26 and axle 28 by U-bolts 30 and 32. Rebound clips 34 and 36, which are bonded to the undersurface of lower spring 16, restrict relative vertical movement of the outer ends of the leaves but permit longitudinal slippage between them.

To facilitate mounting of the assembly to the vehicle chassis (not shown), the opposing ends of leaves 12 and 14 have been formed as shown into conventional military wrapped eyes. Alternately, various other well-known spring mounting means, such as slipper brackets, might be used with appropriate modification of the spring ends. While in the preferred embodiment all leaves are of composite construction, it might be desirable for some applications to combine composite and solid steel springs where additional stiffness is required. Also, this embodiment might be easily adapted to include a center bolt passing vertically through the center of each spring to hold the stack in alignment. Because stress concentrations tend to build up around the bolt, it should preferably be eliminated.

Referring to the cross-sectional view of the outer sections of spring 12 shown in FIG. 3, it can be seen that it has a core 38 which is disposed between and bonded to a pair of outer skins 40 and 42. Each of the skins is preferably of uniform thickness and made of high-strength steel, although any one of a variety of other materials which has a very high elastic strain energy and essentially isotropic physcial properties could be used. Steel is particularly desirable in making vehicle springs because it has high resistance to impact and wear, bonds strongly, and exhibits good fatigue properties. Two specific examples of steels which might be used for the skins are AISI 1095, which has been cold rolled, heat treated, and shot peened, and amorphous laser-hardened steel. In the preferred embodiment, the skins are uniform in width along the entire length of each leaf to minimize manufacturing costs, but the width can be varied if desired. The skin material should be able to withstand the impact of flying rocks or other debris. It is desirable that the skin material have a minimum specific ultimate energy absorption capacity to provide a fracture point of about 7,000 inch-lbs/in$^3$ in a standard tensile fracture test.

Core 38 can be made of any one of a variety of stiff plastic materials. Ideally, the plastic should have a low density, high impact resistance, good tensile fatigue properities, and a modulus of at least 10,000 psi. Also, it should adhere strongly to steel and exhibit satisfactory resistance to a "road spray"-type environment. Further, the chosen core material should have sufficient isotropic physical properties to handle the loads imposed in all directions. Preferably, the core will be a thermosetting polymer for reasons discussed below, but thermoplastic polymers might also be used. The core material may be a pure resin or it may be a composite of resin filled with such materials as glass bubbles or wood fiber to further reduce the weight and cost of the core.

An important characteristic of the spring is that it meet the following criterion:

if F equals the static loaded force (in lbs) exerted on the spring, which is supported at its ends;

L equals the length of the spring (in inches) between the end supports;

N equals the number of composite leaves in the spring (each leave comprising two skins bonded to a core); and $T_s$ equals the thickness (in inches) of each skin in each composite leaf;

then:

$$T_s \leq (FL/N)^{\frac{1}{2}}/1500.$$

For example, in a 4 inch wide, 54 inch long (L) "built-up" spring having 4 leaves (N) and designed to withstand a static load of about 4,350 lbs (F), a skin thickness $T_s$ of 0.097 inch was used. According to the criterion, the maximum allowable skin thickness ($T_s$) would be:

$$T_s \leq ((4350)(54)/4)^{\frac{1}{2}}/1500 \approx 0.161 \text{ inch.}$$

The top leaf, which includes the integral eyes for mounting the "built-up" spring to the frame, is ordinarily made with skins which are thicker than the other skins on other leaves of the "built-up" spring. This top leaf must react against fore and aft forces exerted on the spring, while the other leaves only react against vertical forces. The greater thickness makes the top leaf stronger so that it can perform its added function.

Also, it is important to understand that the thin steel skins act together through the plastic core in the same manner as the surface layers of a solid beam rather than as two separate leaves merely held apart but functioning essentially independently of one another. The theory of beams is discussed in *Standard Handbook for Mechanical Engineers*, 7th ed. (McGraw-Hill 1967) at pp. 5-29 through 5-51 (incorporated by reference into this disclosure).

A particularly significant aspect of this invention is that it provides for a method for producing a composite leaf spring at a much lower cost than has been previously known. The first step in assembling the disclosed spring is to clean the bonding surfaces of the skins to insure a strong bond between the skins and the core material. Next, the skins are placed in a female mold which will hold the skins in a particular desired position in a spaced relation. After the mold has been closed, the plastic core material, which has been maintained in a liquid state, is poured or injected into the mold. Many commonly available thermosetting plastics will set up in a few minutes so the entire molding process can be completed rather quickly. Because the pressures involved in the molding process are relatively low, hard tooling of the mold is not required. A positioning mold of the type to be used in this process is well known to those of ordinary skill and need not be described in further detail.

As previously mentioned, a variety of plastics might be used to form the core, but for a number of reasons, a thermosetting plastic is more desirable. The primary reason to use thermosetting resins is that they tend to form a much better bond with metals than do thermoplastic resins. Also, the mold is relatively large one and will require a significant amount of material to be injected or poured. During the injection process, the core material will have to be maintained in a liquid state for a significant period of time in order to insure that the mold is completely filled and that all gases are eliminated. Under these circumstances, it is preferable to use a thermosetting plastic because its setup time can be easily controlled by varying the amount of catalyst when it is mixed. On the other hand, a thermoplastic resin, which must be held at an elevated temperature in order to maintain it in a liquid state, will degrade continuously until it is permitted to solidify. Accordingly, the time available for molding is necessarily limited.

Alternately, the spring could be assembled using the more conventional technique of molding the core separately and then bonding the skins to it. If this method is used, thermoplastic resins could more easily be employed as the core material, but additional manufacturing steps will be involved and one of the primary advantages of this invention would be lost.

In FIG. 5, an alternate embodiment of the subject spring is illustrated which includes a novel, integrally molded eye designated by the numeral 44. The spring assembly has an upper leaf 46, a center spring 48, and a lower spring 50, all of which are of composite construction similar to spring 12, previously described. In order to form the eye, the outer section of skin 52 is shaped into loop 54, encircling bushing 56 as shown. Next, the outer section of skin 58 is formed into loop 60, encircling loop 54 and bushing 56, and reversed so as to lie flush with the upper surface of outer skin 52. During assembly, these components are held in position by the mold, and core material is poured or injected into cavities 64 and 66. If desired, additional bonding surface around bushing 56 can be obtained by spacing loop 54 slightly apart from the bushing and injecting core material completely around the outer surface of the bushing.

Thus it can be seen that the present invention provides for an improved composite leaf spring and a method for assembling the same which incorporate many novel features and offer significant advantages over the prior art. Although only two specific embodiments of this invention have been illustrated and described, it is to be understood that obvious modifications and changes can be made in them without departing from the true scope and spirit of this invention.

I claim:

1. A composite leaf spring for use in a vehicle suspension system or the like, comprising:
   a pair of metal outer skins; and
   a stiff plastic core disposed between and bonded to each of said outer skins, said spring being further defined to meet the following criterion:
   If F equals the static loaded force (in lbs) exerted on the spring, which is supported at its ends;
   L equals the length of the spring (in inches) between the end supports;
   N equals the number of composite leaves in the spring (each leave comprising two skins bonded to a core); and
   $T_s$ equals the thickness (in inches) of each skin in each composite leaf;
   then:

$$T_s \leq (FL/N)^{\frac{1}{2}}/1500.$$

2. The spring of claim 1 wherein said outer skins are of uniform thickness.

3. The spring of claim 1 wherein said outer skins and said core are of uniform width.

4. The spring of claim 1 wherein said outer skins have substantially isotropic physical properties.

5. The spring of claim 1 wherein said core is a thermosetting polymer.

6. The spring of claim 1 wherein said core is a thermoplastic polymer.

7. The spring of claim 1 wherein said core is filled polymer.

8. The spring of claim 1 wherein said core is a syntactic foam.

9. The spring of claim 1 wherein said core is tapered in either direction from a point of maximum thickness located intermediate its ends.

10. The spring of claim 1 wherein each skin has a fracture point at least about 7,000 inch-lbs/in$^3$.

11. The spring of claim 1 wherein one outer skin is primarily in tension and the other is primarily in compression when the spring is deflected in bending.

12. A composite leaf spring for use in a vehicle suspension system or the like, comprising:
   a pair of metal outer skins, each having substantially isotropic physical properties and a uniform width and thickness; and
   a stiff plastic core having a shearing modulus of at least 10,000 psi disposed between and bonded to said skins, wherein said core is tapered in either direction from a point of maximum thickness located intermediate its ends and has substantialy isotropic physical properties, said spring being further defined the meet the following criterion:
   if F equals the static loaded force (in lbs) exerted on the spring, which is supported at its ends;
   L equals the length of the spring (in inches) between the end supports;
   N equals the number of composite leaves in the spring (each leave comprising two skins bonded to a core); and
   $T_s$ equals the thickness (in inches) of each skin in each composite leaf;
   then:

$$T_s \leq (FL/N)^{\frac{1}{2}}/1500.$$

13. The spring of claim 12 wherein each skin has a fracture toughness at least about 7,000 inch-lbs/in$^3$.

* * * * *